US012645577B2

(12) United States Patent
Ayyapureddi

(10) Patent No.: US 12,645,577 B2
(45) Date of Patent: Jun. 2, 2026

(54) MEMORY DEVICE WITH A DIE HAVING MULTIPLE PSEUDO CHANNELS PER CHANNEL

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/790,391

(22) Filed: Jul. 31, 2024

(65) Prior Publication Data

US 2025/0061070 A1     Feb. 20, 2025

Related U.S. Application Data

(60) Provisional application No. 63/532,653, filed on Aug. 14, 2023.

(51) Int. Cl.
*G06F 12/02* (2006.01)
*G06F 13/16* (2006.01)

(52) U.S. Cl.
CPC ...... *G06F 12/0223* (2013.01); *G06F 13/1678* (2013.01); *G06F 13/1684* (2013.01)

(58) Field of Classification Search
CPC ............. G06F 13/1678; G06F 13/1684; G06F 12/0223
See application file for complete search history.

(56) References Cited

U.S. PATENT DOCUMENTS

| | | | |
|---|---|---|---|
| 11,189,338 B1 * | 11/2021 | Camarota | ............... H01L 25/18 |
| 11,360,897 B1 * | 6/2022 | Suh | ...................... G06F 12/0864 |
| 11,893,240 B2 | 2/2024 | Thoziyoor et al. | |
| 11,907,141 B1 * | 2/2024 | Suh | ..................... G06F 12/0623 |

(Continued)

FOREIGN PATENT DOCUMENTS

| | | |
|---|---|---|
| KR | 20210093521 A | 7/2021 |
| TW | 202042066 A | 11/2020 |
| WO | 2022220965 A1 | 10/2022 |

OTHER PUBLICATIONS

Mellor, C., "DRAM, it stacks up: SK Hynix rolls out 819GB/s HBM3 tech," 2021, available: https://www.theregister.com/2021/10/20/sk_hynix_hbm3/.*

(Continued)

*Primary Examiner* — Tracy A Warren
(74) *Attorney, Agent, or Firm* — Dorsey & Whitney LLP

(57) ABSTRACT

A memory device (e.g., a high-bandwidth (HBM) memory device) that includes a memory die having multiple pseudo channels per channel is disclosed. The memory die can include first memory banks associated with a first channel (e.g., having a first command address (CA) bus) and a first pseudo channel (e.g., having a first data (DQ) bus) and second memory banks associated with the first channel and a second pseudo channel (e.g., having a second DQ bus). Operations can be performed at the first memory banks or the second memory banks in response to a command received through the first CA bus. The operations can cause data to be returned to circuitry that routes the data to an interface to the first DQ bus or an interface to the second DQ bus based on whether the data resulted from operations at the first memory banks or the second memory banks.

21 Claims, 8 Drawing Sheets

(56)  References Cited

U.S. PATENT DOCUMENTS

| | | | |
|---|---|---|---|
| 12,277,055 | B1 * | 4/2025 | Zhu ..................... G06F 12/0607 |
| 12,505,032 | B2 | 12/2025 | Ayyapureddi |
| 2020/0356488 | A1 * | 11/2020 | Malladi ................. G11C 11/417 |
| 2022/0229790 | A1 | 7/2022 | Nale |
| 2022/0414047 | A1 | 12/2022 | Das Sharma |
| 2023/0046313 | A1 | 2/2023 | Cariello et al. |
| 2023/0102680 | A1 | 3/2023 | Kanayama et al. |
| 2023/0178121 | A1 | 6/2023 | Nygren |
| 2023/0298631 | A1 * | 9/2023 | Park ........................ H01L 25/18 |
| 2024/0053898 | A1 | 2/2024 | Zhang et al. |

OTHER PUBLICATIONS

International Application No. PCT/US2024/041972—International Search Report and Written Opinion, mailed Nov. 27, 2024, 9 pages.
U.S. Appl. No. 18/790,537—Notice of Allowance and Fee(s) Due, mailed Aug. 21, 2025, 16 pages.

\* cited by examiner

100

200
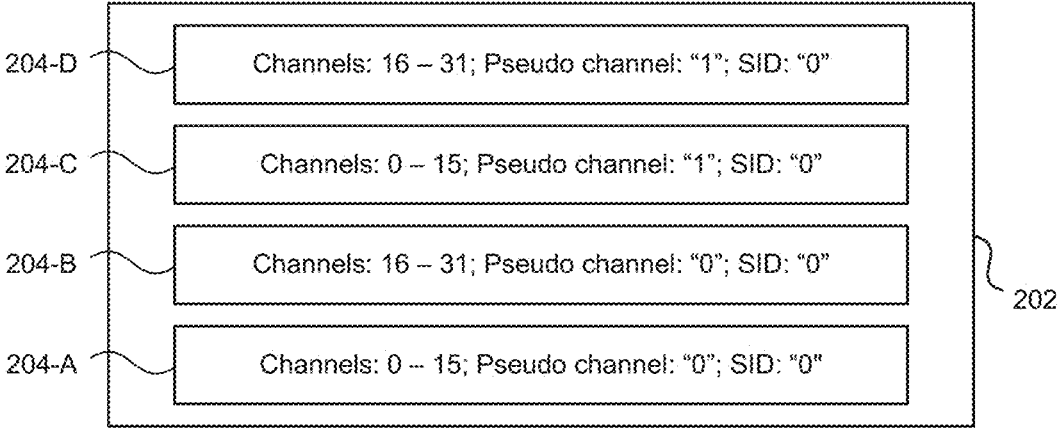
204-D — Channels: 16 – 31; Pseudo channel: "1"; SID: "0"
204-C — Channels: 0 – 15; Pseudo channel: "1"; SID: "0"
204-B — Channels: 16 – 31; Pseudo channel: "0"; SID: "0"
204-A — Channels: 0 – 15; Pseudo channel: "0"; SID: "0"
202
*FIG. 2*

500

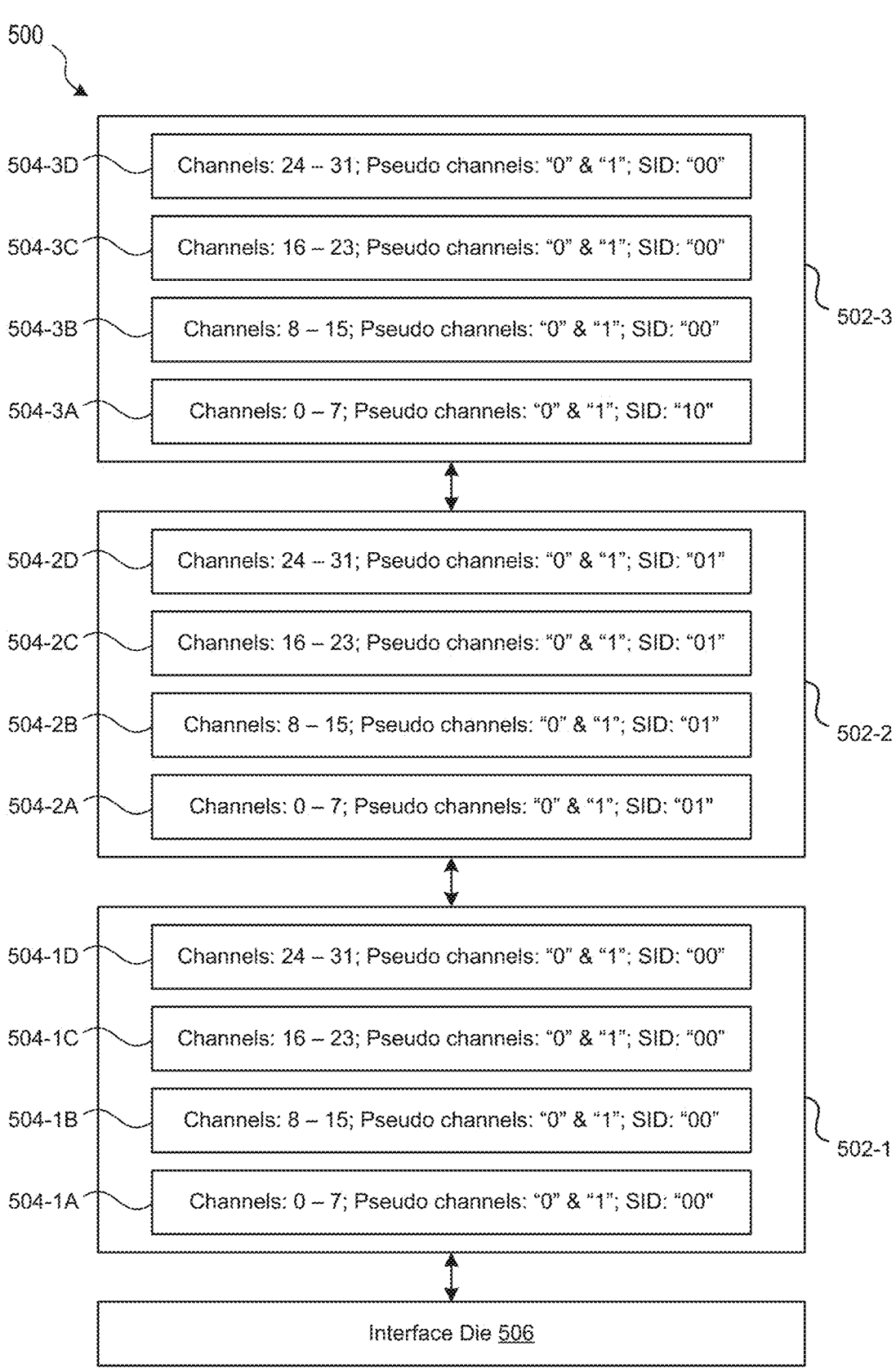

504-3D — Channels: 24 – 31; Pseudo channels: "0" & "1"; SID: "00"

504-3C — Channels: 16 – 23; Pseudo channels: "0" & "1"; SID: "00"

504-3B — Channels: 8 – 15; Pseudo channels: "0" & "1"; SID: "00"

504-3A — Channels: 0 – 7; Pseudo channels: "0" & "1"; SID: "10"

502-3

504-2D — Channels: 24 – 31; Pseudo channels: "0" & "1"; SID: "01"

504-2C — Channels: 16 – 23; Pseudo channels: "0" & "1"; SID: "01"

504-2B — Channels: 8 – 15; Pseudo channels: "0" & "1"; SID: "01"

504-2A — Channels: 0 – 7; Pseudo channels: "0" & "1"; SID: "01"

502-2

504-1D — Channels: 24 – 31; Pseudo channels: "0" & "1"; SID: "00"

504-1C — Channels: 16 – 23; Pseudo channels: "0" & "1"; SID: "00"

504-1B — Channels: 8 – 15; Pseudo channels: "0" & "1"; SID: "00"

504-1A — Channels: 0 – 7; Pseudo channels: "0" & "1"; SID: "00"

502-1

Interface Die 506

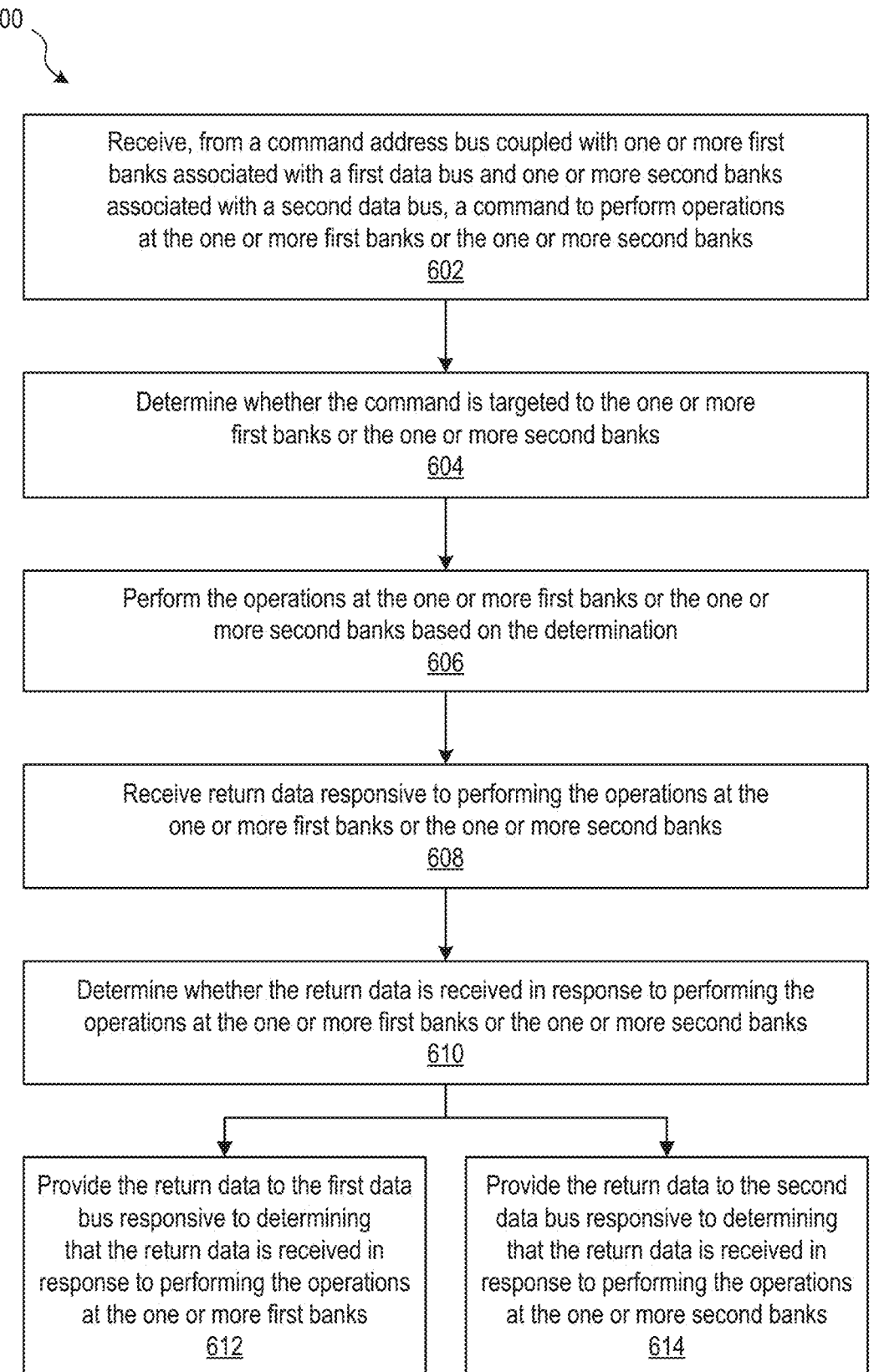

Receive, from a command address bus coupled with one or more first banks associated with a first data bus and one or more second banks associated with a second data bus, a command to perform operations at the one or more first banks or the one or more second banks
602

Determine whether the command is targeted to the one or more first banks or the one or more second banks
604

Perform the operations at the one or more first banks or the one or more second banks based on the determination
606

Receive return data responsive to performing the operations at the one or more first banks or the one or more second banks
608

Determine whether the return data is received in response to performing the operations at the one or more first banks or the one or more second banks
610

Provide the return data to the first data bus responsive to determining that the return data is received in response to performing the operations at the one or more first banks
612

Provide the return data to the second data bus responsive to determining that the return data is received in response to performing the operations at the one or more second banks
614

FIG. 6

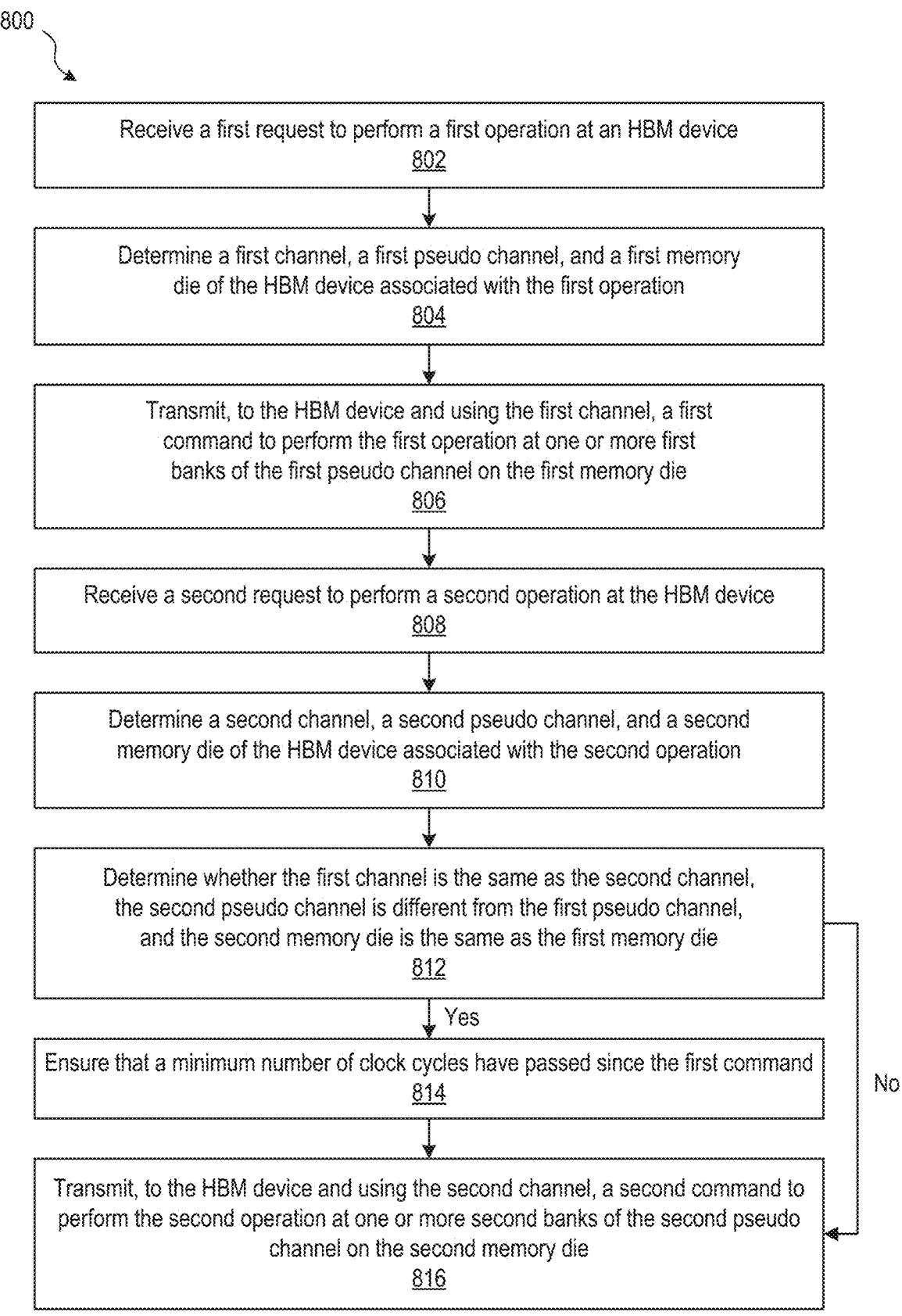

800

Receive a first request to perform a first operation at an HBM device
802

Determine a first channel, a first pseudo channel, and a first memory die of the HBM device associated with the first operation
804

Transmit, to the HBM device and using the first channel, a first command to perform the first operation at one or more first banks of the first pseudo channel on the first memory die
806

Receive a second request to perform a second operation at the HBM device
808

Determine a second channel, a second pseudo channel, and a second memory die of the HBM device associated with the second operation
810

Determine whether the first channel is the same as the second channel, the second pseudo channel is different from the first pseudo channel, and the second memory die is the same as the first memory die
812

Yes

No

Ensure that a minimum number of clock cycles have passed since the first command
814

Transmit, to the HBM device and using the second channel, a second command to perform the second operation at one or more second banks of the second pseudo channel on the second memory die
816

*FIG. 8*

MEMORY DEVICE WITH A DIE HAVING MULTIPLE PSEUDO CHANNELS PER CHANNEL

CROSS-REFERENCE TO RELATED APPLICATION(S)

The present application claims priority to U.S. Provisional Patent Application No. 63/532,653, filed Aug. 14, 2023, the disclosure of which is incorporated herein by reference in its entirety.

TECHNICAL FIELD

The present disclosure generally relates to memory devices and more particularly relates to a memory device with a die having multiple pseudo channels per channel.

BACKGROUND

New designs for memory devices are being developed to enable faster, less-expensive, and more-reliable computing. For example, new communication technologies can increase the efficiency of communications between memory controllers and the memory devices. Concurrently, designers are implementing additional memory dies in memory devices to increase the memory capacity of these devices. Some methods for increasing the capacity of memory devices, however, may not be compatible with new technologies. As a result, these memory devices can operate inefficiently.

BRIEF DESCRIPTION OF THE DRAWINGS

FIG. 2 illustrates an example 4N architecture.

FIG. 5 illustrates an example memory device in accordance with an embodiment of the present technology.

FIG. 6 illustrates an example method for operating a memory device in accordance with an embodiment of the present technology.

FIG. 8 illustrates an example method for operating a memory controller in accordance with an embodiment of the present technology.

DETAILED DESCRIPTION

Figure 1:
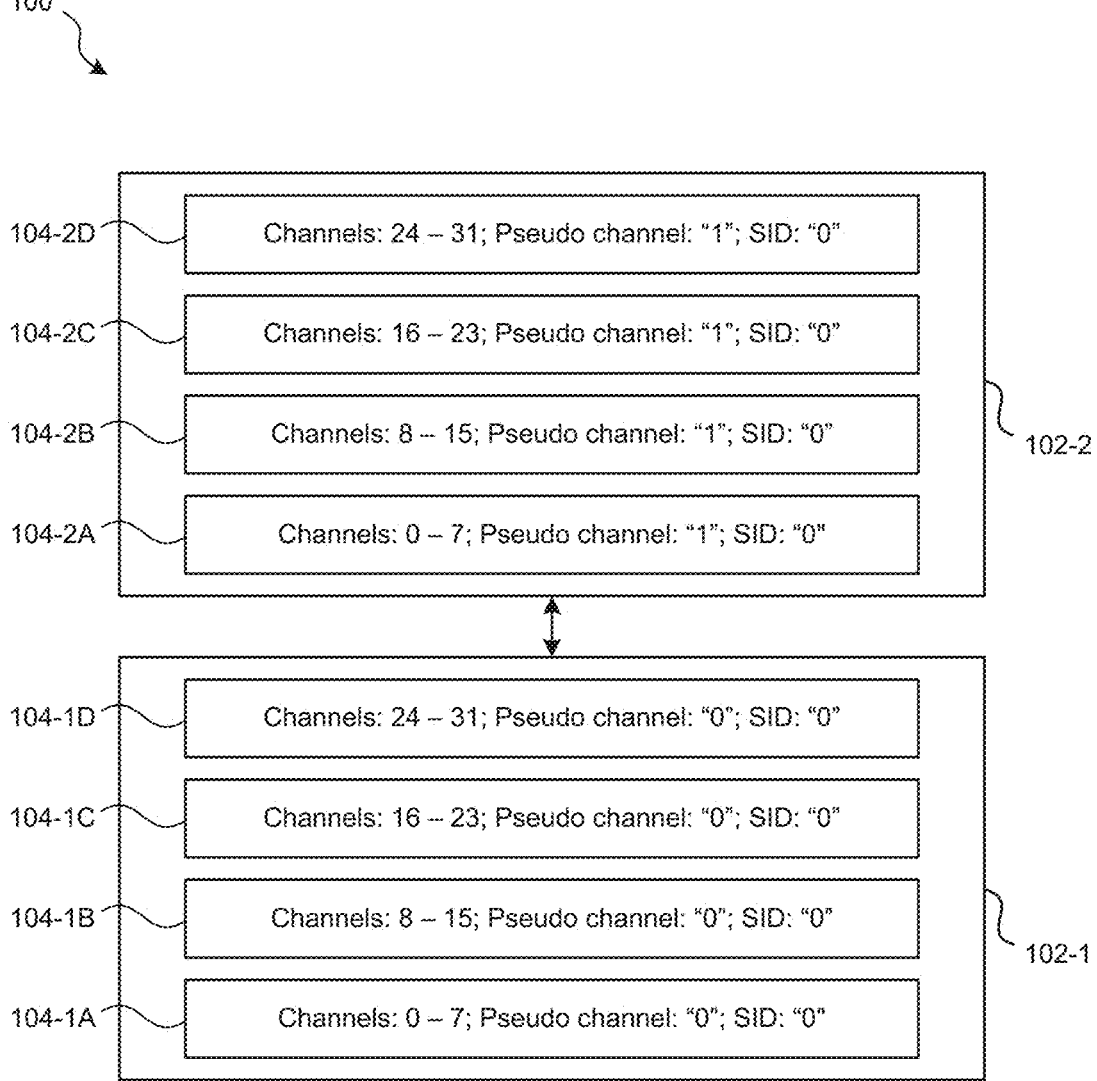
FIG. 1 illustrates an example high bandwidth memory (HBM) device.

Memory devices can be used to implement memory, which stores data to be operated on by a processor or other component of a host computing device. As applications for computing devices become more complex, memory devices that can store greater amounts of data and communicate that data more quickly with a host computing device are desired. Accordingly, techniques to improve the efficiency and overall capacity of memory devices are needed. One technique to improve the efficiency of memory devices is to develop communication technologies that enable fast and reliable communication of data to and from different components. For example, memory banks can be arranged (e.g., coupled with different buses) such that they can store or return data in a more efficient manner (e.g., communicate with a higher bandwidth). Moreover, the overall capacity of the memory devices can be increased by implementing additional memory dies into the memory device. For example, memory dies can be stacked vertically to increase the number of data-storing circuit components in the memory device without increasing the device's footprint.

While these techniques individually can be used to increase memory efficiency and capacity, challenges can arise when trying to increase the capacity of devices designed for these improved communication technologies. Take, for example, a high-bandwidth memory (HBM) device, which includes a stack of multiple memory dies (e.g., DRAM dies). The HBM device can be compliant with the HBM specification (e.g., the HBM3 specification, the HBM4 specification, or any past or future generations of the HBM specification) and designed to communicate data with an increased bandwidth in comparison to those of other memory devices.

An HBM device (e.g., an HBM3 device, an HBM4 device, or an HBM device compliant with any past or future generations of the HBM specification) can include a number of independent interfaces, known as channels, to a host system. Each channel provides access to an independent set of storage of the HBM device (e.g., requests from one channel do not access data associated with a different channel), and the channels can be operated independently without needing to be synchronized. Furthermore, each channel consists of an independent command interface (comprising, e.g., a command address (CA) bus) and data interface (comprising, e.g., a data (DQ) bus). The HBM device can include a different number of channels depending on the HMB specification with which the device complies. For example, an HBM3-compliant device can include 16 channels. As a further example, an HBM4-compliant device can include 32 channels.

An HBM device can further subdivide channels into pseudo channels. For example, each channel can be divided into a pseudo channel 0 (PC0) and a pseudo channel 1 (PC1). The pseudo channels of a channel can operate semi-independently from one another. For example, the DQ bus of a channel can be divided between the two pseudo channels (e.g., a 128-bit DQ bus of a channel can be divided as a 64-bit bus for PC0 and a 64-bit bus for PC1). However, the pseudo channels may share portions of the channel's command interface, such as the channel's CA bus.

As illustrated in FIG. 1, an HBM device 100 can include eight memory dies 104 (e.g., memory dies 104-1A, 104-1B, 104-1C, 104-1D, 104-2A, 104-2B, 104-2C, 104-2D) stacked vertically onto one another (referred to as an 8H stack), where the eight memory dies are split into two four-die halves 102 (e.g., four-die halves 102-1 and 102-2). The illustrated HBM device 100 includes 32 channels (channels 0-31). As illustrated in FIG. 1, the 32 channels are assigned to both four-die halves 102 (i.e., four-die half 102-1 includes channels 0-31, and four-die half 102-2 also includes channels 0-31), and the 32 channels are further sub-divided evenly among the dies 104 of a four-die half 102 (e.g., eight channels are assigned to each die 104-1 of four-die half 102-1, and eight channels are assigned to each die 104-2 of four-die half 102-2, for 32 channels total in each four-die half). Each four-die half 102 of the eight-die stack can be associated with a distinct pseudo channel (e.g., the 32 channels distributed over the first half 102-1 of the stack represent first pseudo channels with identifier "0" or "PC0," and the 32 channels distributed over the second half 102-2 of the stack represent second pseudo channels with identifier "1" or "PC1"). Some versions of the HBM specification (e.g. HBM4) require that HBM devices include 32 channels further subdivided into two pseudo channels, regardless of the overall capacity of the HBM device. It will be appreciated that in the configuration of memory dies illustrated in FIG. 1 (i.e., where each memory die 104 includes 8 channels and 1 pseudo channel), an eight-die stack is needed to satisfy the requirements of an HBM specification requiring 32 channels further subdivided into two pseudo channels. In aspects, this architecture can be referred to as an 8N architecture because the requirements of the HBM specification is satisfied, at minimum, using eight dies. In other words, the HBM device 100 illustrates a representation of an 8N architecture, as eight memory dies are needed to form a self-sustaining cube that is compliant with the HBM4 specification (as well as other versions of the specification with the same channel and pseudo channel requirements).

The HBM device 100 with an 8N architecture can be symmetrical, such that each of the channels has the same number of memory banks assigned to each of the two pseudo channels, when implemented as an eight-die device. In fact, symmetrical devices can be created at each multiple of eight dies. For example, a 16-die HBM device (referred to as a 16H device) can be formed from 2 stacks of 8N devices. As a further example, a 24-die HBM device (referred to as a 24H device) can be formed from 3 stacks of 8N devices. Each stack of 8N devices can be identified by a stack identifier (SID). For example, in the 8H HBM device 100 illustrated in FIG. 1 (formed from a single 8N stack), all memory dies 104 in the 8N stack are associated with SID 0. In a 16H HBM device formed from two 8N stacks (not shown), one 8N stack may be associated with SID 0 and the other 8N stack may be associated with SID 1. As a further example, in a 24H HBM device formed from three 8N stacks (not shown), a first 8N stack may be associated with SID 00, a second 8N stack may be associated with SID 01, and a third 8N stack may be associated with SID 10.

There exists, however, a desire to create HBM devices that do not contain a multiple of eight dies. For example, an HBM device made up of 12 memory dies may be desired (referred to as a 12H stack). HBM devices made up of other multiples of four memory dies, that are not multiples of eight (e.g., 20H stack, 28H stack, 36H stack, etc.), may also be desired. There exists, however, various challenges with 12H, 20H, 28H, etc. HBM devices. As explained herein, some of these challenges arise from requirements of the HBM specification (e.g., HBM4 and other versions requiring that the HBM device provide 32 channels further subdivided into two pseudo channels, with symmetry among the memory capacity allocated to each channel and pseudo channel) that may not be satisfied using the 8N architecture illustrated in FIG. 1. For example, a hypothetical 12H HBM device could be assembled based on the 8N architecture using a combination of eight memory dies of the 8N architecture (e.g., four-die halves 102-1 and 102-2 illustrated in FIG. 1), associated with SID 0 and four memory die of the 8N architecture (e.g., an additional instance of four-die half 102-1 illustrated in FIG. 1), associated with SID 1. However, such a configuration would violate symmetry requirements of the HBM specification. In the hypothetical 12H device, the first pseudo channel would include the four-die half 102-1 of the eight-die stack (associated with SID 0) as well as the additional instance of the four-die half 102-1 (associated with SID 1), while the second pseudo channel would only include the four-die half 102-2 of the eight-die stack (associated with SID 0). The hypothetical 12H HBM device would therefore be asymmetrical, since each pseudo channel would be associated with a different number of memory banks within the HBM device. Specifically, the hypothetical 12H device would have twice the number of memory banks associated with the first pseudo channel compared to those associated with the second pseudo channel. This asymmetry can be difficult for a memory controller to handle. For example, the memory controller would have to issue twice as many commands to the memory banks associated with the first pseudo channel compared to the memory banks associated with the second pseudo channel, which can be difficult given that the memory banks of the first and second pseudo channels are coupled with the same CA buses.

Accordingly, there is a need to develop an architecture for a four-die self-sustaining cube (referred to as a 4N architecture) that is compliant with the versions of the HBM specification that require 32 channels further subdivided into two pseudo channels As described herein, a 4N architecture (where the four memories dies within the 4N self-sustaining cube symmetrically provide 32 memory channels further subdivided into two pseudo channels) enables HBM devices that are compliant with HBM4 (and other version of the HBM specification with similar channel and pseudo channel requirements) assembled from 12 memory dies, 20 memory dies, 28 memory dies, etc.

As illustrated in FIG. 2, an example 4N architecture 200 can include a four-die stack 202. The four-die stack 202 includes memory dies 204 (e.g., memory dies 204-A, 204-B, 204-C, 204-D), where each memory die 204 implements twice the number of channels compared to the memory dies 104 of the memory device 100 of FIG. 1 (e.g., each memory die 204 implements 16 channels, compared to each memory die 104 that implements 8 channels). By doubling the number of channels on each of the memory dies 204, two sets of the 32 channels (each associated with a different pseudo channel) can be implemented within a single four-die stack (e.g., having a single SID). For example, and as illustrated in FIG. 2, memory die 204-A and memory die 204-B can implement 32 channels associated with a first pseudo channel having identifier "0" or "PC0," and memory die 204-C and memory die 204-D can implement 32 channels associated with a second pseudo channel having identifier "1" or "PC1." In this way, the four-die stack 202 can include 32 channels each subdivided into two pseudo channels, where each pseudo channel has an equal number of memory banks. In other words, the illustrated 4N architecture 200 enables a stack of four memory dies to satisfy the requirements of versions of the HBM specification that require 32 symmetrical channels, each further subdivided into two pseudo channels. Thus, a symmetric 12H HBM device can be implemented using three stacks of 4N architecture 200, where each 4N stack has a different SID. There exists, however, certain shortcomings with the illustrated 4N architecture 200. For example, doubling the number of channels implemented by a memory die (from 8 to 16 channels per die) can cause the memory device to have a higher cost or design complexity, given that the additional channels may require additional command interfaces (e.g., CA buses), additional circuitry to decode commands on the additional command interfaces, etc. Therefore, it may be advantageous to achieve a symmetrical 12H HBM memory device without requiring 16 channels per memory die.

To address these challenges and others, embodiments of the present technology relate to a memory device, such as an HBM device, that includes one or more memory die that implement multiple pseudo channels (e.g., PC0 and PC1 of a channel) on the memory die. As described herein, each of the multiple pseudo channels on the memory die can be associated with a different DQ bus. In some embodiments, the different DQ buses of the multiple pseudo channels of a channel are provided by different portions of the corresponding channel's DQ bus. For example, in embodiments in which the DQ bus of a channel is 128-bits, one pseudo channel can be associated with the lower 64-bits (e.g., PC0), and the other pseudo channel can be associated with the upper 64-bit (e.g., PC1) of the channel DQ bus. As further described herein, each of the multiple pseudo channels on the memory die can be associated with the same command interface (e.g., CA bus) of the corresponding channel. The memory die can include a channel with a first set of memory banks associated with a first DQ bus, thereby implementing a first pseudo channel, and a second set of memory banks associated with a second DQ bus, thereby implementing a second pseudo channel. The memory die can include circuitry to determine whether to route a command received over the channel's command interface to the first set of memory banks or the second set of memory banks. Return data resulting from executing the command at the first set of memory banks or the second set of memory banks can then be received by the circuitry, and the circuitry can determine whether the return data resulted from operations at the first set of memory banks or the second set of memory banks. Based on the determination, the circuitry can route the return data to the first DQ bus or the second DQ bus. In doing so, a memory device can be implemented that includes a channel having multiple pseudo channels on the same memory die, in contrast to memory devices discussed above that implement only a single pseudo channel of a channel.

In aspects, implementing multiple pseudo channels of a channel on the same memory die can impose additional timing constraints and/or parameters. For example, a memory die that implements multiple pseudo channels of a channel may require a specific timing parameter, referred to herein as "tCCDPC_SID," when performing operations at a first pseudo channel and a second pseudo channel of the same channel. In aspects, tCCDPC_SID can represent a minimum delay that that must be adhered to when performing concurrent and/or back-to-back commands at different pseudo channels of the same channel on a single die. The timing parameter tCCDPC_SID can be used to mitigate contention for resources internal to the memory die. For example, an internal data path used to return data from the memory banks may be shared by the first pseudo channel and the second pseudo channel, such that only one pseudo channel can use the internal data path at a time. When first data is returned, for example, from the first set of memory banks implementing the first pseudo channel, the first data can be transported along the internal data path over multiple clock cycles. As a result, a subsequent command to the second set of memory banks implementing the second pseudo channel, which causes second data to be returned on the internal data path while the first data is still being transported on the internal data path, could cause contention on the internal data path. To avoid such contention, embodiments of the present technology disclose a timing parameter (e.g., tCCDPC_SID) that governs successive commands to different pseudo channels of a channel on a same memory die. For example, a memory controller can be directed to separate successive commands to different pseudo channels of a channel on a same memory die by at least the time required for data to clear the shared internal data path. As a further example, the memory controller may be configured to delay a successive command to a different pseudo channel of a channel on a same memory die until the requirement of the timing parameter tCCDPC_SID has been satisfied. In doing so, data contention on the internal data path can be eliminated.

Example Operating Environment

Figure 3:
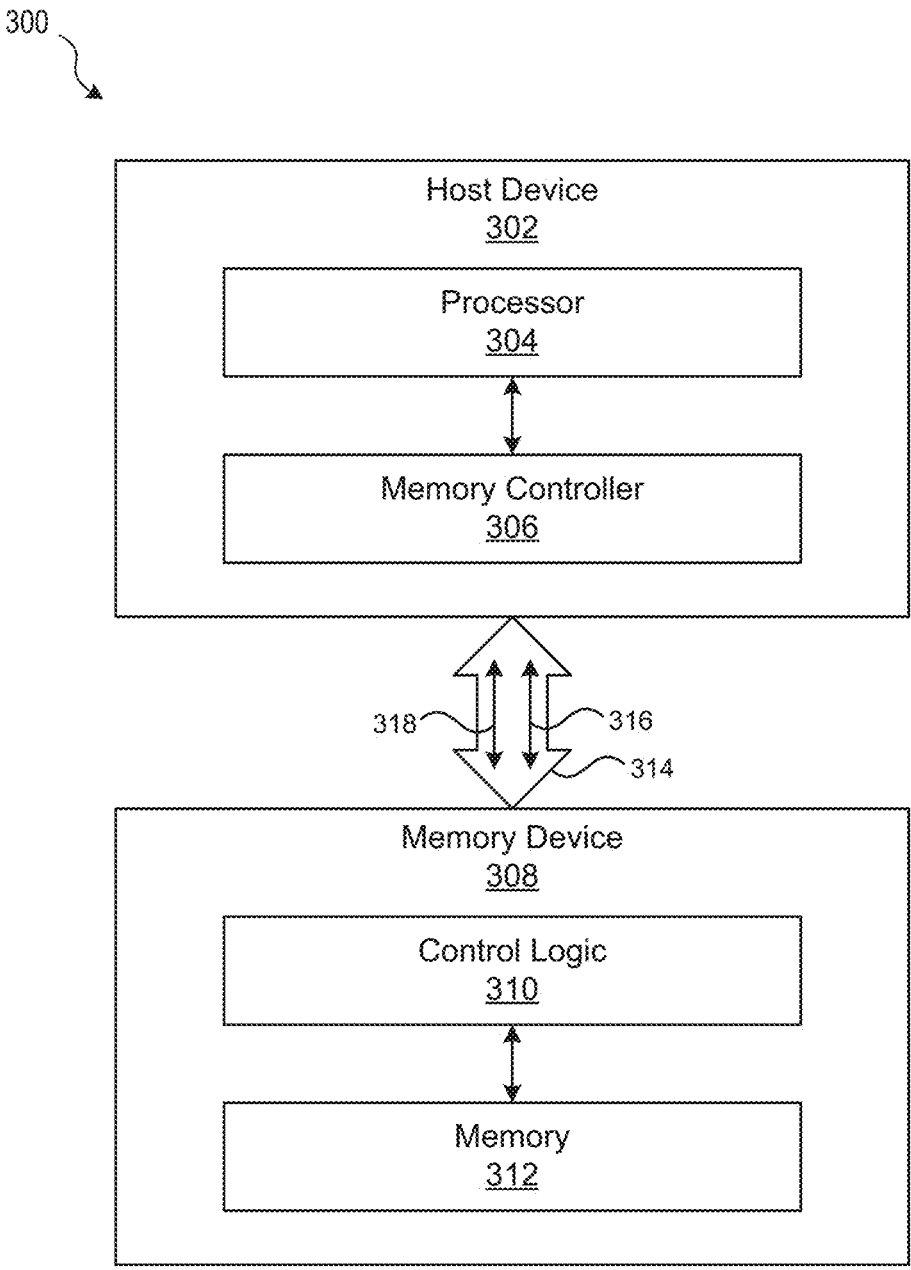
FIG. 3 illustrates an example operating environment for a memory device in accordance with an embodiment of the present technology.

FIG. 3 illustrates an example computing device 300 in which various techniques and devices described herein can operate. The computing device 300 includes a host device 302, which has at least one processor 304 and at least one memory controller 306, and a memory device 308, which includes control logic 310 and memory 312. In some examples, memory controller 306 may be an aspect of, and may reside on or within, the processor 304. The computing device 300 further includes an interconnect 314. The computing device 300 can be any type of computing device, computing equipment, computing system, or electronic device, for example, hand-held devices (e.g., mobile phones, tablets, digital readers, and digital audio players), computers, vehicles, or appliances. Components of the computing device 300 may be housed in a single unit or distributed over multiple, interconnected units (e.g., through wired or wireless interconnects). In aspects, the host device 302 and the memory device 308 are discrete components mounted to and electrically coupled through an interposer (e.g., implementing a portion of the interconnect 314).

As shown, the host device 302 and the memory device 308 are coupled with one another through the interconnect 314. The processor 304 executes instructions that cause the memory controller 306 of the host device 302 to send signals on the interconnect 314 that control operations at the memory device 308. The memory device 308 can similarly communicate data to the host device 302 over the interconnect 314. The interconnect 314 can include one or more CA buses 316 and one or more DQ buses 318. The CA buses 316 can communicate control signaling indicative of commands to be performed at select locations (e.g., addresses) of the memory device 308. The DQ buses 318 can communicate data between the host device 302 and the memory device 308. For example, the DQ buses 318 can be used to communicate data to be stored in the memory device 308 in accordance with a write request, data retrieved from memory device 308 in accordance with a read request, or an acknowledgment returned from the memory device 308 in response to successfully performing operations (e.g., a write operation) at the memory device 308. The CA buses 316 can be realized using a group of wires, and the DQ buses 318 can encompass a different group of wires of the interconnect 314. As some examples, the interconnect 314 can include a front-side bus, a memory bus, an internal bus, a peripheral control interface (PCI) bus, etc.

The processor 304 can read from and write to the memory device 308 through the memory controller 306. The processor 304 may include the computing device's host processor, central processing unit (CPU), graphics processing unit (GPU), artificial intelligence (AI) processor (e.g., a neural-network accelerator), or other hardware processor or processing unit.

The memory device 308 can be integrated within the host device 302 or separate from the computing device 300. The memory device 308 can include any memory 312, such as integrated circuit memory, dynamic memory, random-access memory (e.g., dynamic random-access memory (DRAM), static random-access memory (SRAM)), or flash memory, to name just a few. The memory device 308 can include memory 312 of a single type or memory 312 of multiple types. In general, the memory device 308 can be implemented as any addressable memory having identifiable locations of physical storage. The memory device 308 can include memory-side control logic 310 that executes commands from the memory controller 306. For example, the control logic 310 can decode signals from the memory controller 306 and perform operations at the memory 312.

As a specific example, the memory device 308 can include an HBM device. For example, the memory device 308 can include an interface die implementing at least a portion of the memory-side control logic 310 and one or more of memory 312 (e.g., memory dies) stacked to the interface die. The memory-side control logic 310 can receive commands from the memory controller 306 through the interconnect 314 and communicate signaling to execute the commands at the memory 312 in an improved manner compared to other memory devices (e.g., with a higher bandwidth). The interconnect 314 can similarly be implemented in accordance with an HBM device. For example, the interconnect 314 can include 32 channels further divided into two pseudo channels per channel. Each channel can be coupled to a CA bus, and each pseudo channel can transmit or receive data through a DQ bus. In some embodiments, the DQ bus of each pseudo channel can be a bus different from the DQ buses of the other pseudo channels of the same channel. In some embodiments, the DQ bus of each pseudo channel can be associated with different portions of the DQ bus of an associated channel. Thus, in some embodiments the interconnect 314 can include twice as many DQ buses 318 (e.g., 64 DQ buses) as CA buses 316 (e.g., 32 CA buses). And in some embodiments the interconnect 314 can include the same number of DQ buses 318 (e.g., 32 buses) as CA buses 316 (e.g., 32 CA buses), where each DQ bus is split into separate portions to be used by the channel's pseudo channels (e.g., a DQ bus 318 is split into an upper portion and a lower portion). Example memory devices that implement multiple pseudo channels per channel on a memory die will be described in greater detail with respect to FIGS. 4 and 5, and aspects of the operation of such memory devices will be illustrated in FIGS. 6-8.

Example Memory Die

Figure 4:
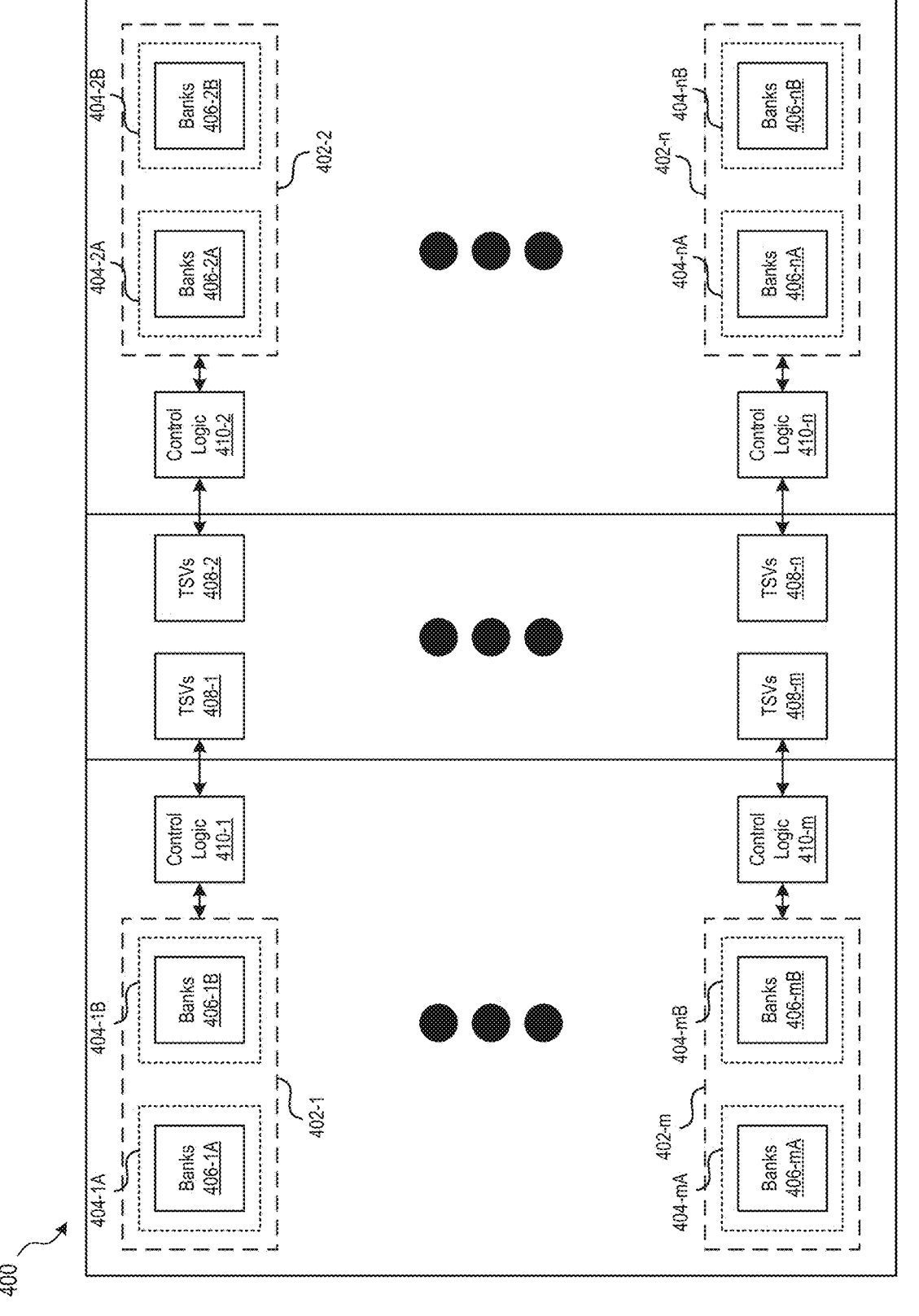
FIG. 4 illustrates an example memory die in accordance with an embodiment of the present technology.

FIG. 4 illustrates an example memory die 400 in accordance with an embodiment of the present technology. In aspects, the memory die 400 can be configured in accordance with a 4N architecture. The memory die 400 includes channels 402 that are further subdivided into multiple pseudo channels 404. The memory die 402 include memory banks 406 that are organized into the channels 402 and the pseudo channels 404. For example, the channel 402-1 is subdivided into a pseudo channel 404-1A and a pseudo channel 404-11B. Memory banks 406-1A and memory banks 406-1B are organized into channel 402-1 such that memory banks 406-1A are associated with pseudo channel 404-1A and memory banks 406-1B are associated with pseudo channel 404-1B. Each of the channels 402 and the pseudo channels 404 couple to through-silicon vias (TSVs) 408, which can provide a command interface (e.g., a CA bus), a data interface (e.g., DQ buses), and other interfaces and/or signaling. For example, each of the channels 402 can couple with a corresponding CA bus, and each of the pseudo channels 404 can transmit/receive data to/from a corresponding DQ bus. Thus, memory banks 406-1A and memory banks 406-1B of channel 402-1 couple with a CA bus implemented in TSVs 408-1, memory banks 406-1A of pseudo channel 404-1A transmit/receive data to/from a first DQ bus of the TSVs 408-1, and memory banks 406-11B of pseudo channel 404-11B transmit/receive data to/from a second DQ bus of the TSVs 408-1. In some embodiments, the first DQ bus associated with the pseudo channel 404-1A, and the second DQ bus associated with the pseudo channel 404-1B, are different portions of the same DQ bus associated with channel 402-1.

Control logic 410 (e.g., a portion of the control logic 310 of FIG. 3) can be implemented for each of the channels 402 between the TSVs 408 and the memory banks 406 to control communication signaling between the memory banks 406 and the TSVs 408. For example, the control logic 410-1 can be implemented between channel 402-1 and TSVs 408-1. In aspects, the control logic 410-1 can be used to decode and analyze commands transmitted through the CA bus of TSVs 408-1 to initiate the performance of operations (e.g., reads or writes) at the memory banks 406-1. Similarly, the control logic 410-1 can route return data (e.g., an acknowledgment of a successful operation or data retrieved from the memory banks 406-1) resulting from performing the operations at the memory banks 406-1 (e.g., memory banks 406-1A and memory banks 406-1B) to the corresponding DQ bus. For example, the control logic 410-1 can route return data resulting from operations at memory banks 406-1A to the first DQ implemented in TSVs 408-1 and route return data resulting from operations at memory banks 406-1B to the second DQ implemented in TSVs 408-1. As a further example, the control logic 410-1 can route return data resulting from operations at both memory banks 406-1A and 406-1B (e.g., when the operation is for an entire channel, as opposed to the pseudo channels subdivided from the channel) to a DQ associated with the channel (e.g., channel 402-1) and implemented in TSVs 408-1.

The memory die 400 can perform operations in accordance with commands received from a memory controller (e.g., memory controller 306 of FIG. 3). A memory controller command received by the memory die 400 can be directed to a channel (and the memory banks associated with that channel) and/or to a pseudo channel subdivided from the channel (and the memory banks associated with that pseudo channel), and received over the command interface associated with the channel. For example, the control logic 410-1 can receive a command to implement a read or write operation at the memory banks 406-1A through the CA bus implemented within the TSVs 408-1. The command can include one or more bits (e.g., in a header) that indicate a targeted rank (e.g., targeted die) and a target pseudo channel (e.g., PC0 or PC1) to which the command is directed.

As described further herein, the TSVs 408 can be shared by other memory dies that implement the same corresponding channel (e.g., when a channel is associated with memory banks on multiple memory dies) and pseudo channels. For example, a second memory die (not shown) also implementing channel 402-1 (and pseudo channels 404-1A and 404-1B) can connect to the same TSVs 408-1 illustrated in FIG. 4. As a result, like pseudo channels on corresponding channels of multiple ranks or memory dies return data on the same DQ buses. To prevent contention on the DQ buses, only a single rank of a same pseudo channel can return data at any one time. Thus, the CA bus implemented within the TSVs 408-1 can couple with multiple ranks or memory dies, and each of the multiple ranks or memory dies can be identified by a stack identifier (SID) (e.g., "0", "1", and so on). The control logic 410-1 can receive command transmitted over the CA bus to which it is coupled and determine if the command includes the SID associated with the memory die 400 (e.g., or rank in which memory die 400 is implemented). If so, the control logic 410-1 can decode the command and transmit signals to targeted memory banks of the channel 402-1. If not, the command can be ignored by the control logic 410-1.

Once the command is determined to be directed to the memory die 400, the command on a CA bus associated with the channel 402-1 can be analyzed to determine which of the memory banks 406-1 are targeted by the command. The command can include one or more bits (e.g., in a header) indicating to which of the pseudo channels 404-1 the command is directed. For example, the command could indicate a single pseudo channel bit with value "0" when the command is directed to pseudo channel 404-1A (e.g., or one or more of memory banks 406-1A) and a single pseudo channel bit with value "1" when the command is directed to pseudo channel 404-1B (e.g., or one or more of memory banks 406-1B). In some embodiments, a memory device that includes the memory die 400 can selectively operate in the pseudo channel mode. Thus, when operating outside of the pseudo channel mode, the command need not include the pseudo channel bit indicating that the command is targeted to a specific pseudo channel. Instead, the pseudo channel bit can be used to address a particular one of the memory banks 406-1, either pseudo channel 404-1A or pseudo channel 404-1B. The control circuitry 410-1 can analyze the command and determine, based on the one or more bits identifying the targeted memory banks and/or pseudo channel, to which of the memory banks 406-1 to transmit signaling to perform the operations indicated by the command. For example, the control logic 410-1 can determine the memory banks 406-1A to be the targeted memory banks when the command indicates it is for the pseudo channel 404-1A. Accordingly, the control logic 410-1 can decode the command to determine a targeted row, a targeted column, and a desired operation associated with the command. The control logic 410-1 can then forward signaling to the targeted memory banks to perform the desired operation at the targeted row and column.

Performing operations at the memory banks 406-1 can cause data to be returned to the control logic 410-1 for output to the memory controller. For example, if the operation is a read operation, the return data can include data stored in the targeted row and column of the memory banks 406-1. Alternatively, if the operations is a write operation, the data can include an acknowledgement (e.g., a success flag or a return of the data that was written) of a successful write operation at the targeted row and column of the memory banks 406-1. Given that the memory banks 406-1A and the memory banks 406-1B are configured to return data on different DQ buses implemented within the TSVs 408-1, the control logic 410-1 can determine to which DQ bus to route the return data to. For example, return data resulting from operations at the memory banks 406-1A can be routed to the first DQ bus of the TSVs 408-1, and return data resulting from operations at the memory banks 406-1B can be routed to the second DQ bus of the TSVs 408-1. In aspects, the control logic 410-1 determines where the return data is originating from by analyzing a header of the return data or based on the previous decision regarding where to route the command from the CA bus. Once routed to the associated DQ bus of the TSVs 408-1, the return data can be transmitted to the memory controller using the associated DQ bus.

In aspects, the internal data path from the memory banks 406-1A to the control logic 410-1, or vice versa, can be at least partially shared with the internal data path from the memory banks 406-1B to the control logic 410-1, or vice versa. Thus, data contention can occur when operations at the memory banks 406-1 cause data to be returned from the memory banks 406-1A and the memory banks 406-1B at the same time. Accordingly, it can be advantageous to mitigate and/or minimize concurrent returns from two pseudo channels of a same channel on a single die. In other aspects, in which memory banks 406-1 are associated with different pseudo channels, the memory banks do not receive commands at the same time (causing data contention) because they share a common command bus. In still other aspects, the memory banks 406-1A and the memory banks 406-1B can each be connected to the TSVs 408-1 through independent data paths, thereby enabling the return data to be routed to the associated DQ buses of the TSVs 408-1 directly through the independent data paths.

Channel 402-2, and additional channels 402 up to and including channel 402-m, and channel 402-n can be similarly configured, where "m" and "n" are positive integers. For example, Channel 402-2 can include pseudo channels 404-2 (e.g., pseudo channel 404-2A having memory banks 406-2A and pseudo channel 404-2B having memory banks 406-2B) coupled with TSVs 408-2 through control logic 410-2. Channel 402-m and channel 402-n can be similarly arranged with pseudo channels 404-m (e.g., pseudo channel 404-mA having memory banks 406-mA and pseudo channel 404-mB having memory banks 406-mB) and pseudo channels 406-n (e.g., pseudo channel 404-nA having memory banks 406-nA and pseudo channel 404-nB having memory banks 406-nB) coupled with TSVs 408-m and TSVs 408-n through control logic 410-m and control logic 410-n, respectively. There can be any number of channels 402 on the memory die 400. As a specific example, n can be eight such that the memory die 400 includes channel 402-1 through channel 402-8. In this way, each rank can include four memory dies having eight channels each, thus implementing 32 channels per rank, as required by the HBM4 specification.

Although illustrated as a single component of control logic, the control logic 410 associated with the various channels 402 can be implemented as discrete portions of control logic. For example, the control logic 410 can be implemented at any location on or off the memory die 400 (e.g., at an interface die of the memory device). In aspects, portions of the control logic 410 can be implemented at different locations. For example, a portion of the control logic 410 responsible for decoding the command or determining the targeted memory banks/dies can be separate from a portion of the control logic 410 responsible for routing the return data to an associated DQ bus. Accordingly, it should be appreciated that the control logic 410 is shown schematically in FIG. 4 as a single component associated with each of the channels 402 for ease of description only.

Example Memory Device

FIG. 5 illustrates an example memory device 500 in accordance with an embodiment of the present technology. As illustrated, the memory device 500 includes three memory ranks 502 (e.g., memory rank 502-1, memory rank 502-2, and memory rank 502-3). Each of the memory ranks 502 can include a same number of memory dies 504. For example, memory rank 502-1 includes memory dies 504-1A, 504-1B, 504-1C, and 504-1D, memory rank 502-2 includes memory dies 504-2A, 504-2B, 504-2C, and 504-2D, and memory rank 502-3 includes memory dies 504-3A, 504-3B, 504-3C, and 504-3D. As illustrated, the memory ranks 502 each include four memory dies 504; however, in other cases, the memory ranks 502 can each include any number of memory dies 504. In aspects, the memory ranks 502 can include an even number of memory dies or include a number of memory dies that is a factor of the number of channels (e.g., 32 channels and four dies per rank). When the number of memory dies 504 is a factor of the number of channels, the number of channels can be distributed evenly across the memory dies 504 of each of the memory ranks 502.

As illustrated, each of the memory dies 504 includes one or more channels further subdivided into two pseudo channels. For example, each of the memory dies 504 includes eight channels, equally subdivided (e.g., such that each pseudo channel has the same number of memory banks) into a pseudo channel having identifier "0" and a pseudo channel having identifier "1." In aspects, no two memory dies of the same rank (e.g., memory dies 504-1 of memory rank 502-1) have the same channel on different memory dies. In some embodiments, given that each of the memory dies 504 include eight channels, a 4H stack having a 4N architecture can comply with the HBM4 specification (e.g., 32 channels further subdivided into two pseudo channels).

The memory ranks 502 can include SIDs, which identify the individual memory ranks within the stack of the memory device 500. Like channels across the various memory ranks 502 can connect to a like CA bus. Similarly, like pseudo channels of these channels can connect to the same DQ buses. Thus, to prevent contention on the DQ bus, the memory device 500 can be configured to or interfaces with a memory controller such that only one of the like pseudo channels on corresponding channels across memory ranks 502 returns data at a single time (e.g., pseudo channel with identifier "0" of channel 1 on memory die 504-2A, or pseudo channel with identifier "0" of channel 1 on memory die 504-1A, but not both, can return data at the same time). To prevent DQ bus contention, commands to the memory device 500 can identify a specific memory rank 502 or set of memory dies 504 to which the command is directed based on the SID. As illustrated in FIG. 5, all memory dies 504 within a single memory rank 502 can be associated with the same SID. Thus, the SID can be used to specify a targeted memory die or targeted memory rank. Given that the memory device 500 can include greater than two memory ranks 502, the SID can include multiple bits to uniquely identify each of the memory ranks 502.

In aspects, the memory device 500 can include an odd number of memory ranks 502. It will be appreciated that in conventional memory devices, in which a channel of a memory die includes only a single pseudo channel, such conventional memory devices would be asymmetric when implemented with an odd number of memory ranks. In contrast, by implementing multiple pseudo channels of a channel on a single die, the memory device 500 provides symmetry even when the memory device 500 has an odd number of memory ranks 502.

The memory dies 504 can be coupled through TSVs that extend through the memory dies 504 (e.g., as illustrated in FIG. 4). Each of the memory dies 504 can be connected or disconnected from specific TSVs based on the channels or pseudo channels present on that memory die. For example, memory die 504-1A, memory die 504-2A, and memory 504-3A can couple with TSVs that implement CA buses for channels 0 through 7 and TSVs that implement DQ buses channels 0 through 7, including the subdivided DQ buses for pseudo channels with identifiers "0" and "1" of those channels. Moreover, control circuitry at memory die 504-1A, memory die 504-2A, and memory 504-3A can be disconnected (e.g., electrically isolated) from CA buses and DQ buses associated with channels 8 through 31. Thus, these memory dies (e.g., memory dies 504-1A through 504-3A) can act as a pass through to other memory dies (e.g., memory dies 504-1B through 504-3B, memory dies 504-1C through 504-3C, and memory dies 504-1D through 504-3D) coupled with the CA buses and DQ buses associated with channels 8 through 31. Memory dies 504-1B through 504-3B, memory dies 504-1C through 504-3C, and memory dies 504-1D through 504-3D can be similarly configured with respect to channels 8 through 15, channels 16 through 23, and channels 24 through 31. Given that each of the channels, which are coupled with respective CA buses, are divided into two pseudo channels, which are coupled with respective DQ buses, the memory device 500 can include twice as many DQ buses as CA buses. In other cases, the respective DQ buses are implemented as separate halves of a same DQ bus (e.g., an upper half and a lower half). Thus, in these cases, the memory device 500 can include the same number of DQ buses as CA buses.

The inclusion of two pseudo channels of a single channel on the same memory die can create data path contention during successive commands at the two pseudo channels of the same channel on a single memory die/rank. Accordingly, in some embodiments of the disclosed technology, a timing parameter, tCCDPC_SID, may be enforced at the memory controller or through delay circuitry at the memory device to prevent data bus contention. For example, when a first command is issued to PC0 of channel 0 of memory die 504-1A and a second command is issued to PC1 of channel 0 of memory die 504-1A, tCCDPC_SID can be enforced to separate the commands. However, the timing parameter need not be enforced when a second command is for a different channel and/or different memory die of the first command. For example, when the second command is instead issued to PC1 of channel 0 of memory die 504-2A, a different memory die from the memory die 504-1A to which the first command is issued, tCCDPC_SID need not be enforced.

The memory device 500 can further include an interface die 506 in accordance with the HBM specification. The interface die 506 can optimize signaling to/from the memory dies of the memory device 500. For example, the interface die 506 can receive commands from a memory controller (e.g., memory controller 306 of FIG. 3) and transmit the commands to the memory dies 504 such that the data can be communicated from the memory dies with a higher bandwidth. The interface die 506 can receive the data from the memory dies 504 and forward the data to the memory controller in an efficient manner.

Example Method for Operating a Memory Device

FIG. 6 illustrates an example method 600 for operating a memory device in accordance with an embodiment of the present technology. Although illustrated in a particular configuration, one or more operations of the method 600 may be omitted, repeated, or reorganized. Additionally, the method 600 may include other operations not illustrated in FIG. 6, for example, operations detailed in one or more other methods described herein. The operations described herein may be implemented in hardware, software executed by a processor, firmware, or any combination thereof. For instance, the operations can be performed by control logic at a memory die of the memory device (e.g., control logic 410 illustrated in FIG. 4).

At 602, a command to perform operations at one or more first memory banks or one or more second memory banks is received from a CA bus. The CA bus is coupled with the one or more first memory banks (associated with a first DQ bus) and the one or more second memory banks (associated with a second DQ bus). The one or more first memory banks and the one or more second memory banks are located on a same memory die. In aspects, the one or more first memory banks are within a first pseudo channel and the one or more second memory banks are within a second pseudo channel.

At 604, it is determined whether the command is targeted to the one or more first banks or the one or more second banks. In aspects, the one or more first banks and the one or more second banks are within a same channel associated with the first pseudo channel and the second pseudo channel. The command can include one or more bits that indicate a pseudo channel, or one or more banks within a pseudo channel, to which the command is directed. For example, the one or more first memory banks can be targeted with a pseudo channel bit equal to "0," and the one or more second memory banks can be targeted with a pseudo channel bit equal to "1."

At 606 and responsive to receiving the command and determining whether the command is targeted to the one or more first memory banks or the one or more second memory banks, the operations are performed at the one or more first memory banks or the one or more second memory banks. For example, if the command is determined to target the first pseudo channel, or the one or more first memory banks specifically, the operations can be performed at the one or more first memory banks. If the command is determined to target the second pseudo channel, or the one or more second memory banks specifically, the operations can be performed at the one or more second memory banks.

At 608 and responsive to performing the operations at the one or more first memory banks or the one or more second memory banks, return data is received. For example, the return data and/or indication of the return data can be received by the control logic of the memory die as a result of a read or write operation at the one or more first memory banks or the one or more second memory banks.

At 610, it is determined whether the return data is received in response to performing the operations at the one or more first memory banks or the one or more second memory banks. For example, the determination can be based on which internal data bus the return data is received from, when the internal data buses are different for each pseudo channel. Alternatively or additionally, the determination can be made based off of the previous determination at 606, where the command is determined to be targeted to a specific set of memory banks. For example, the one or more bits specifying a targeted pseudo channel, or more specifically a set of banks, can be stored in a mode register or in control logic, based on which it can be determined from where the return data is received.

At 612 and responsive to determining that the return data is received in response to performing the operations at the one or more first memory banks, the return data is provided to the first DQ bus. As discussed, the first DQ bus can be a DQ bus associated with the first pseudo channel and/or a portion of the associated channel DQ bus used by the first pseudo channel. Alternatively, at 614 and responsive to determining that the return data is received in response to performing the operations at the one or more second memory banks, the return data is provided to the second DQ bus. The second DQ bus can be a DQ bus associated with the second pseudo channel and/or a portion of the associated channel DQ bus used by the second pseudo channel. In doing so, a memory device with a die having multiple DQ buses per CA bus can be implemented.

Example Timing Parameter to Reduce Data Path Contention

Figure 7:
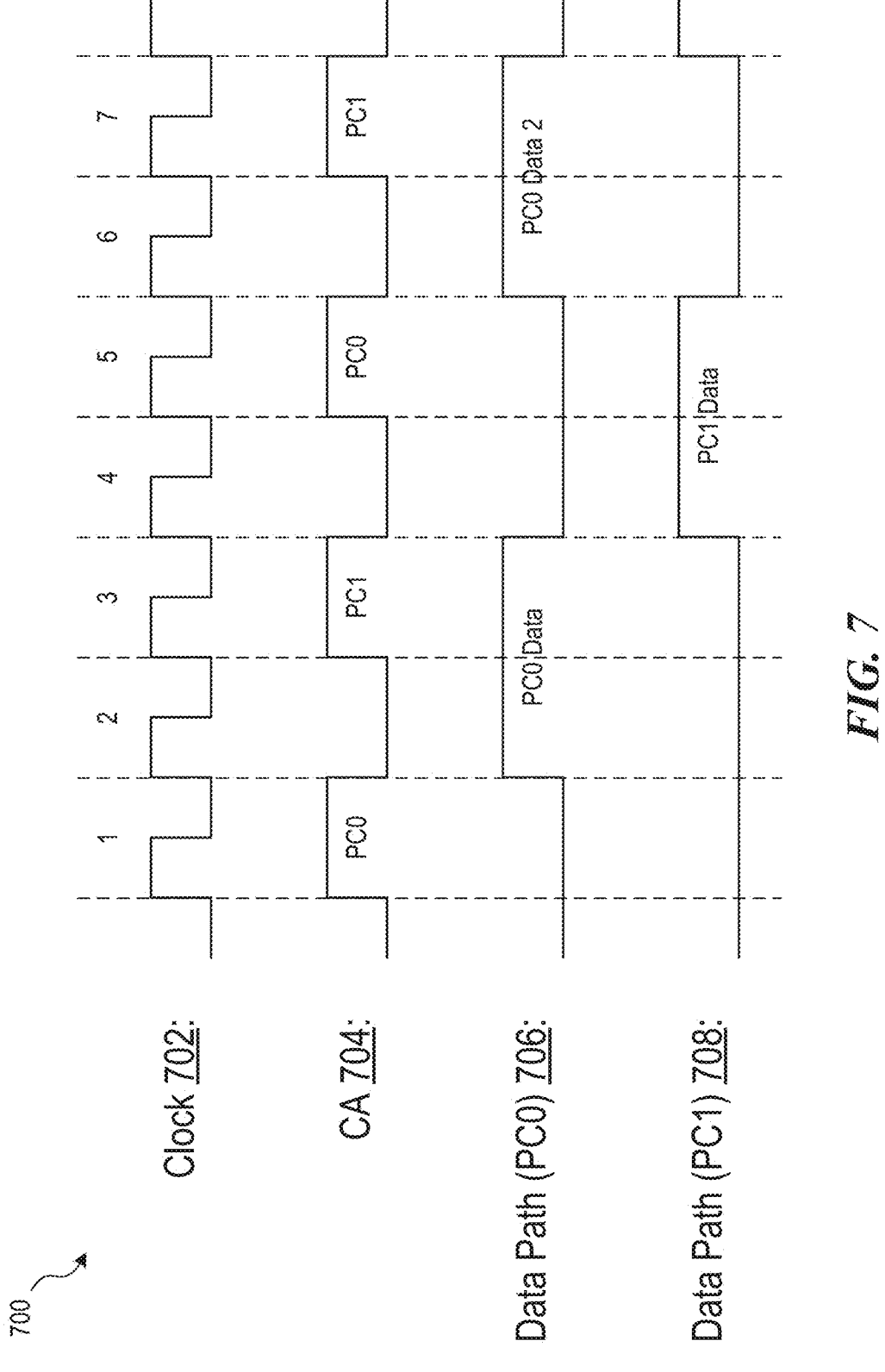
FIG. 7 illustrates an example timing diagram for a memory device in accordance with an embodiment of the present technology.

As discussed above, the inclusion of two pseudo channels of a single channel on the same memory die can create data path contention during successive commands at the two pseudo channels. Accordingly, in some embodiments of the disclosed technology, a timing parameter, which may be referred to as tCCDPC_SID, may be enforced at the memory controller or through delay circuitry at the memory device to prevent data bus contention. FIG. 7 illustrates an example timing diagram 700 for a memory device in accordance with an embodiment of the present technology. Specifically, the timing diagram 700 illustrates example command signaling when the tCCDPC_SID is enforced. tCCDPC_SID can represent a minimum time and/or number of clock cycles between commands to different pseudo channels of the same channel on a single die. For example, a second command addressing a second pseudo channel of a channel on a memory die may be delayed when tCCDPC_SID has not elapsed since a first command addressing a first pseudo channel of the channel on the memory die. In some embodiments, the pseudo channel bit and the SID communicated over a command interface (e.g., a CA bus) can be used to determine the pseudo channel and the memory die/memory rank for commands, while the command interface over which the command is received indicates the channel. For example, when commands on a same CA bus (targeting a same channel) have different pseudo channel bits and the same SID, tCCDPC_SID can be enforced.

As illustrated, the timing diagram 700 includes a clock 702, which can be used to synchronize communication between the memory controller and the memory device. The timing diagram 700 further includes a schematic of signaling along a CA bus 704. For example, the CA bus 704 can be a CA bus coupled with two pseudo channels, PC0 and PC1. The pseudo channels PC0 and PC1 can be associated with a first DQ bus and a second DQ bus, respectively, such that data from memory banks within PC0 are returned on the first DQ bus and data from memory banks within PC1 are returned on the second DQ bus. Data can be provided from the memory banks within PC1 to the first DQ bus on a data path (e.g., internal to the memory die) illustrated schematically in FIG. 7 as data path 706. Similarly, signaling on a data path 708 (e.g., internal to the memory die) carrying data from the memory banks within PC1 to the second DQ bus is illustrated schematically in the timing diagram 700. In aspects, the data path 706 and the data path 708 can be at least partially shared between PC0 and PC1. In other words, in aspects, a memory die has a single internal data path over which data associated with PC0 and PC1 can be transmitted. Accordingly, when PC0 and PC1 are both required to transmit data along the data path 706 and the data path 708 at a same time (e.g., in response to commands from a memory controller), data contention can occur. Such data contention can result in unpredictable results, including the inaccurate return of data from the memory device.

To limit the occurrence of data contention on the shared data path (e.g., illustrated as data path 706 and data path 708), the described technology may impose a timing parameter, tCCDPC_SID, (e.g., on a memory controller issuing commands) regarding the timing of successive commands to two pseudo channels of a single channel on a same memory die. It will be appreciated that the tCCDPC_SID need not be imposed on conventional memory devices, in which the pseudo channels of a single channel are distributed across multiple memory dies, because in those conventional memory devices successive commands to two pseudo channels of a single channel will not contend for the same data path internal to the same die. In contrast, by implementing the pseudo channels on a same die, successive commands to different pseudo channels of a single channel on a same die can cause data contention for on-die resources, including the data path of a memory die. It will be appreciated that this possibility of contention is distinct from, and in addition to, contention of resources shared by the multiple memory dies of a memory device.

To prevent this, a subsequent command of the successive commands can be delayed according to parameter tCCDPC-_SID, which enables return data resulting from a first command to clear the internal data path before return data resulting from a second command would need to be transmitted on the internal data path. For example, successive commands to different pseudo channels of a single channel on a same die can be spaced such that the beginning (e.g., leading edge) of each command is separated by at least as many clock cycles as are required for the return data from the first command to clear the internal data path (e.g., as illustrated, two clock cycles). In aspects, the time it takes for the return data to clear the internal data path can be based on the width of the data relative to the width of the data path.

With reference to the timing diagram 700, commands are issued to perform successive operations at the memory banks of PC0 and the memory banks of PC1 in accordance with the timing parameter tCCDPC_SID. For example, a command to perform operations at the memory banks of PC0 is transmitted at the first clock cycle of clock 702 using the CA bus 704. Logic coupled with the CA bus 704 receives the command and transmits signaling to the memory banks of PC0 in response to receiving the command such that the operations (e.g., read or write operations) are performed at the memory banks of PC0. In response to performing the operations, return data, PC0 Data, is returned along the internal data path 706 during the second and third clock cycles of the clock 702. PC0 Data then reaches the DQ bus associated with PC0 at the fourth clock cycle such that PC0 Data is transmitted to the memory controller using the DQ bus associated with PC0.

Additionally, a command to perform operations at the memory banks of PC1 is transmitted at the third clock cycle of the clock 702 along the CA bus 704. As described herein, the transmittal of the command to perform the operations on PC1 may have been delayed to the third cycle, for example by a memory controller and/or memory device, to adhere to parameter tCCDPC_SID. Logic coupled with the CA bus 704 receives the command and transmits signaling to the memory banks of PC1 in response to receiving the command such that the operations (e.g., read or write operations) are performed at the memory banks of PC1, thereby causing data, PC1 Data, to be returned along the internal data path 708 during the fourth and fifth clock cycles of the clock 702. As illustrated by the example timing diagram, the PC0 Data clears the internal data path after the third clock cycle, and therefore PC1 Data can be transmitted along the internal data path 708 without data contention until it reaches the DQ bus associated with PC1 at the sixth clock cycle. From there, PC1 Data can be returned to the memory controller through the DQ bus associated with PC1. Thus, as illustrated, the command to perform operations at the memory banks of PC1 can be transmitted sometime subsequent to the transmittal of the command to perform operations at PC0, even if the prior PC0 operations have not entirely completed, as long as PC0 Data clears the data path 706 before PC1 Data is transmitted on the data path 708. In some embodiments, tCCDPC_SID is such that it allows for PC1 Data to enter the data path 708 just after (e.g., on the next clock cycle) PC0 Data clears the data path 706, thereby fully utilizing the internal data bus. In some embodiments tCCDPC_SID is such that the internal data path shared by PC0 and PC1 can be efficiently utilized (e.g., 100% utilization or "gapless communication"), by separating successive commands to different pseudo channels of a single channel on a same memory die by the time and/or precise number of clock cycles required for return data to clear the shared data path.

Subsequent memory commands can be transmitted at the CA bus 704 in accordance with the same timing parameter. For example, as illustrated, an additional command to perform additional operations at memory banks of PC0 is transmitted on the CA bus 704 at the fifth clock cycle of the clock 702. In this way, the additional command targeting PC0 is spaced from the prior command targeting PC1 at least by the time parameter. In response to the command, the additional operations are performed at the memory banks of PC0, and PC0 Data 2 is returned on the data path 706 beginning at the sixth clock cycle of the clock 702. PC0 Data 2 then clears the data path 706 and is transmitted along the DQ bus associated with PC0 at the eighth clock cycle of the clock 702. Moreover, another command targeting the memory banks of PC1 is issued at the seventh clock cycle of the clock 702, thereby continuing the pattern.

As demonstrated, by separating the beginning of subsequent commands to access different pseudo channels of a single channel on a same memory die by the disclosed timing parameter, data contention can be prevented on the shared data path. Although in some embodiments tCCDPC-_SID is based on the time it takes after a command issues for data associated with the command to clear a shared data path, in some embodiments tCCDPC_SID can be based on different or additional requirements. For example, in some embodiments tCCDPC_SID is based on the minimum number of clock cycles delay between successive commands (e.g., column commands) to different bank groups of a memory die, tCCDS (e.g., tCCDPC_SID=tCCDS). Specifically, in some DRAM standards, such as the Double Data Rate 4 (DDR4) standard, Graphics Double Data Rate 5 (GDDR5), and various generations of the HBM standard, bank grouping is supported on a memory die. Different bank groups can have different internal data paths from the bank group to an internal data path shared across the bank groups. Moreover, different bank groups can have local I/O gating from the internal data path unique to that bank group to the internal data path shared across the bank groups. In aspects, tCCDS can be equal to the time required to transfer a single atom of data (e.g., the smallest addressable unit for the memory) on an I/O bus (e.g., the data bus), tBURST. tCCDS can be less than a delay required to implement successive commands (e.g., column commands) on a same bank group, tCCDL.

In some embodiments, the timing parameter is not enforced when successive commands are issued to different pseudo channels of a same channel on different memory dies (e.g., across different memory ranks). Thus, although not illustrated, a memory controller could issue a command to PC1 of a same channel but different die in relation to an earlier-issued command to PC0 without abiding by the timing parameter. For example, the memory controller could issue the command to PC0 of the channel on a first die during a first clock cycle and could issue the command to PC1 of the same channel on a different die during the next clock cycle. In this way, return data from the command issued to PC0 and return data from the command issued to PC1 on the same channel but a different die can be transmitted on the respective internal data paths at a same time.

It will be appreciated that successive commands issued to the same pseudo channel and/or different pseudo channels of the same channel on different dies may be governed by one or more other timing parameters (e.g., different from tCCDPC_SID). When command are issued to different memory dies, the data paths internal to the memory dies are not used by the return data from different commands. However other resource contentions can arise. For example, the same pseudo channels on different dies can share a same DQ bus such that the DQ bus is used to return data from each of the memory dies. Thus, the commands should be spaced such that data from each of the dies is not returned on the DQ bus at the same time. For example, the commands can be spaced by at least the amount of time required for data returned from the first memory die to clear the DQ bus. In doing so, the data returned from the first memory die can clear the DQ bus before data from the second memory die reaches the DQ bus.

Although the various timing parameters, including tCCDPC_SID, are discussed as being governed by the memory controller, in some embodiments the memory device includes delay circuitry to enforce the disclosed timing parameters and/or additional timing parameters. In this way, the timing parameters can be enforced even when a memory controller has not been configured to operate in accordance with the timing parameters. The delay circuitry can be implemented at any location. For example, the delay circuitry can be implemented at one or more of the memory dies to delay the execution of operations performed in response to commands received through the CA buses. In the specific example of an HBM device, the delay circuitry can be implemented at an interface die of the HBM device.

It is also appreciated that the illustrated timing diagram 700 is one example of memory device operation, among others. In this way, specific details of the timing diagram can deviate from those illustrated. For example, the memory device can operate for more or fewer clock cycles than illustrated. The commands can be transmitted over a greater number of clock cycles, or the data can be returned over a greater or fewer number of clock cycles. Given that the time delay between successive commands to the same pseudo channel on a same channel of a single die can be governed by the amount of time it takes the data to clear the internal data path, the number of clock cycles between successive commands can differ from those illustrated in FIG. 7. Moreover, the memory device can issue different command from those illustrated in FIG. 7.

Example Method for Operating a Memory Controller

FIG. 8 illustrates an example method 800 for operating a memory controller in accordance with an embodiment of the present technology. Although illustrated in a particular configuration, one or more operations of the method 800 may be omitted, repeated, or reorganized. Additionally, the method 800 may include other operations not illustrated in FIG. 8, for example, operations detailed in one or more other methods described herein. The operations described herein may be implemented in hardware, software executed by a processor, firmware, or any combination thereof. In aspects, the one or more of the operations of method 800 can be performed by a memory controller communicatively coupled with a memory device.

At 802, a first request to perform a first operation at a memory device (e.g., an HBM device) is received. The request can be received from a processor of a host device. The first operation can include a read or a write operation at one or more first memory banks of the memory device.

At 804, the first operation is determined to be associated with a first channel, a first pseudo channel, and a first memory die of the memory device. For example, the first request can be analyzed to determine the location (e.g., one or more first memory banks) at which the first operation is requested to be performed. In aspects, the first operation can be performed at a location at which data requested to be read from memory is stored or the location of a memory cell at which data can be written to. The one or more first memory banks at which the first operation is to be performed can be used to determine the first channel, the first pseudo channel, and the first memory die. For example, the first channel can be a channel that includes the one or more first memory banks, the first pseudo channel can be a first pseudo channel that includes the one or more first memory banks, and the first memory die can be a memory die that includes the one or more first memory banks.

At 806, a first command is transmitted to the memory device using the first channel. For example, the first command can be transmitted on a first CA bus associated with the first channel. The first command can cause the first operation to be performed at the one or more first banks of the first pseudo channel on the first memory die. The first command can include bits to identify the first pseudo channel, the first memory die, and/or the one or more first banks. For example, the first command can include a pseudo channel bit to indicate the first pseudo channel associated with the first command, one or more bits to indicate the SID of the first memory die associated with the first command, or one or more bits to indicate the bank address of the one or more first memory banks.

At 808, a second request to perform a second operation at the memory device is received. The request can be received from a processor of a host device. The first operation can include a read or a write operation at one or more second memory banks of the memory device.

At 810, the second operation is determined to be associated with a second channel, a second pseudo channel, and a second memory die of the memory device. The second channel, the second pseudo channel, and the second memory die can be determined in a similar manner to the first channel, the first pseudo channel, and the first memory die. For example, one or more second memory banks at which the second operation is to be performed can be used to determine the second channel, the second pseudo channel, and the second memory die.

At 812, it is determined whether the first channel is the same as the second channel, the second pseudo channel is different from the first pseudo channel, and the second memory die is the same as the first memory die. If the conditions are determined to be true, the method 800 can continue at 814.

At 814, it is ensured that a minimum number of clock cycles have passed since transmitting the first command. For example, the minimum number of clock cycles can be determined to correspond to tCCDPC_SID. In some cases, ensuring that the minimum number of clock cycles have passed since transmitting the first command includes determining the number of clock cycles that have passed since transmitting the first command (e.g., a leading edge of the first command). If the number of clock cycles is determined to be greater than the minimum number of clock cycles, the method 800 can continue at 816. If, however, the number of clock cycles is determined to be less than the minimum number of clock cycles, a delay can be executed before the method 800 continues at 816. In doing so, the delay can ensure that the minimum number of clock cycles have passed before continuing at 816 where the second command is transmitted.

At 816, the second command is transmitted to the HBM device using the second channel. For example, the second command can be transmitted on a second CA bus associated with the second channel. The second command can cause the second operation to be performed at the one or more second banks of the second pseudo channel on the second memory die. The second command can include bits to identify the second pseudo channel, the second memory die, or the one or more second memory banks. For example, the second command can include a pseudo channel bit to indicate the pseudo channel associated with the second command, one or more bits to indicate the SID of the second memory die associated with the second command, or one or more bits to indicate the bank address of the one or more second memory banks. In embodiments, one or more of the second CA bus, the second channel, the second pseudo channel, and/or the second memory die can be the same as the first CA bus, the first channel, the first pseudo channel and/or the first memory die.

Alternatively, referencing back at 812, if one or more of the conditions are determined to be false, the method can continue at 816 without ensuring that a minimum number of clock cycles have passed since transmission of the first command at 814 (e.g., while still adhering to a timing parameter different from tCCDPC_SID). In this way, tCCDPC_SID can be enforced when successive commands are made to different pseudo channels of a same channel on a single die and need not be enforced when one or more of these conditions are not satisfied.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A high-bandwidth memory (HBM) device comprising:
a plurality of channels each associated with a command address bus, each channel subdivided into a plurality of pseudo channels each associated with a data bus;
a plurality of memory dies, a memory die of the plurality of memory dies comprising:
an interface to a command address bus associated with a first channel;
an interface to a first data bus associated with a first pseudo channel of the first channel;

an interface to a second data bus associated with a second pseudo channel of the first channel;
first memory banks associated with the first pseudo channel of a first channel;
second memory banks associated with the second pseudo channel of the first channel; and
control circuitry configured to:
responsive to a determination that first return data is received at the control circuitry from the first memory banks in response to performing first operations at one or more of the first memory banks, provide the first return data to the interface to the first data bus, wherein the first operations are associated with a first command received via the command address bus.

2. The HBM device of claim 1, wherein the memory die further comprises a shared internal data path configured to:
communicate data between the first memory banks and the control circuitry; and
communicate data between the second memory banks and the control circuitry.

3. The HBM device of claim 1, wherein:
the HBM device is compliant with one or more aspects of the HBM4 specification; and
the HBM device further comprises a plurality of memory ranks; and
each of the memory ranks comprise four memory dies arranged in a 4N architecture such that the four memory dies in total comprise 32 channels each having respective memory banks that are equally subdivided into a first respective pseudo channel and a second respective pseudo channel.

4. The HBM device of claim 1, wherein:
the HBM device comprises an odd number of memory ranks; and
each of the memory ranks comprise 32 channels each having respective memory banks that are equally subdivided into a first respective pseudo channel and a second respective pseudo channel.

5. The HBM device of claim 1, wherein:
the plurality of memory dies comprises twelve memory dies;
each of the channels are subdivided into a first respective pseudo channel and a second respective pseudo channel; and
a same number of memory banks are associated with the first respective pseudo channel and the second respective pseudo channel.

6. The HBM device of claim 1, wherein the first data bus and the second data bus comprise separate halves of a same data bus.

7. A memory device comprising:
a memory die including:
an interface to a first data bus of the memory device;
an interface to a second data bus of the memory device;
an interface to a command address bus of the memory die;
one or more first memory banks coupled with the interface to the command address bus and associated with the first data bus;
one or more second memory banks coupled with the interface to the command address bus and associated with the second data bus; and
circuitry configured to:
receive return data responsive to performing operations at the one or more first memory banks or the one or more second memory banks, the operations associated with a command received from the command address bus;

determine whether the return data is received in response to performing the operations at the one or more first memory banks or the one or more second memory banks;

responsive to the determination that the return data is received in response to performing the operations at the one or more first memory banks, provide the return data to the interface to the first data bus; and responsive to the determination that the return data is received in response to performing the operations at the one or more second memory banks, provide the return data to the interface to the second data bus.

8. The memory device of claim 7, wherein the memory die further comprises a shared internal data path configured to:

communicate data between the one or more first memory banks and the circuitry; and communicate data between the one or more second memory banks and the circuitry.

9. The memory device of claim 7, wherein:

the command comprises one or more bits that specify targeted memory banks of the command; and the memory die further comprises:

additional circuitry coupled with the command address bus and configured to:

receive the command;

determine, based on the one or more bits, whether the one or more first memory banks or the one or more second memory banks are the targeted memory banks; and perform the operations at the one or more first memory banks or the one or more second memory banks, based on the determination of whether the one or more first memory banks or the one or more second memory banks are the targeted memory banks.

10. The memory device of claim 7, wherein:

the command comprises one or more bits that specify the memory die as a targeted memory die; and the memory die further comprises:

additional circuitry coupled with the command address bus and configured to:

receive the command;

determine, based on the one or more bits, that the memory die is the targeted memory die; and responsive to the determination that the memory die is the targeted memory die, perform the operations at the one or more first memory banks or the one or more second memory banks.

11. The memory device of claim 7, wherein:

the command comprises a read command; and the return data comprises data stored in the one or more first memory banks or the one or more second memory banks.

12. The memory device of claim 7, wherein:

the command comprises a write command; and the return data comprises an acknowledgment of successfully writing data to the one or more first memory banks or the one or more second memory banks.

13. The memory device of claim 7, wherein the memory device is a high-bandwidth memory (HBM) device, the first command address bus is associated with a channel, the first data bus is associated with a first pseudo channel of the channel, and the second data bus is associated with a second pseudo channel of the channel.

14. A method comprising:

receiving, from a command address bus coupled with one or more first memory banks associated with a first data bus and one or more second memory banks associated with a second data bus, a command to perform operations at the one or more first memory banks or the one or more second memory banks, the one or more first memory banks and the one or more second memory banks located on a memory die;

responsive to receiving the command, determining whether the command is targeted to the one or more first memory banks or the one or more second memory banks;

responsive to the determination that the command is targeted to the one or more first memory banks, performing the operations at the one or more first memory banks;

responsive to the determination that the command is targeted to the one or more second memory banks, performing the operations at the one or more first memory banks;

responsive to performing the operations at the one or more first memory banks or the one or more second memory banks, receiving return data;

determining whether the return data is received in response to performing the operations at the one or more first memory banks or the one or more second memory banks;

responsive to the determination that the return data is received in response to performing the operations at the one or more first memory banks, providing the return data to the first data bus; and responsive to the determination that the return data is received in response to performing the operations at the one or more second memory banks, providing the return data to the second data bus.

15. The method of claim 14, further comprising transmitting the return data from the one or more first memory banks or the one or more second memory banks to the first data bus or the second data bus on an internal data path of the memory die that is shared by the one or more first memory banks and the one or more second memory banks.

16. The method of claim 14, wherein the command comprises one or more bits that specify the one or more first memory banks or the one or more second memory banks as targeted memory banks for the operations, the method further comprising:

determining, based on the one or more bits, that the one or more first memory banks or the one or more second memory banks are the targeted memory banks; and responsive to the determination that the one or more first memory banks or the one or more second memory banks are the targeted memory banks, performing the operations at the one or more first memory banks or the one or more second memory banks.

17. The method of claim 14, wherein the command comprises one or more bits that specify the memory die as a targeted memory die, the method further comprising:

determining, based on the one or more bits, that the memory die is the targeted memory die; and responsive to the determination that the memory die is the targeted memory die, performing the operations at the one or more first memory banks or the one or more second memory banks.

18. The method of claim 14, wherein the command comprises a read command, the method further comprising retrieving the return data stored at the one or more first memory banks or the one or more second memory banks.

19. The method of claim 14, wherein the command comprises a write command, the method further comprising:

storing data at the one or more first memory banks or the one or more second memory banks; and receiving the return data that comprises an acknowledgment of successfully storing the data at the one or more first memory banks or the one or more second banks.

20. The method of claim 14, wherein the method comports to one or more aspects of the high bandwidth memory specification.

21. The HBM device of claim 1, wherein the control circuitry is further configured to:

responsive to a determination that second return data is received at the control circuitry from the second memory banks in response to performing second operations at one or more of the second memory banks, provide the second return data to the interface to the second data bus, wherein the operations are associated with a second command received via the command address bus.

\* \* \* \* \*